(12) United States Patent
Xie et al.

(10) Patent No.: US 7,969,848 B1
(45) Date of Patent: Jun. 28, 2011

(54) SYSTEM AND METHOD OF DECOUPLING ASYMMETRY FROM BASELINE COMPENSATION

(75) Inventors: Jin Xie, Longmont, CO (US); Mats Oberg, Cupertino, CA (US); Jingfeng Liu, Longmont, CO (US); Zachary Keirn, Loveland, CO (US)

(73) Assignee: Marvell International Ltd., Hamilton (BM)

( * ) Notice: Subject to any disclaimer, the term of this patent is extended or adjusted under 35 U.S.C. 154(b) by 653 days.

(21) Appl. No.: 12/017,786

(22) Filed: Jan. 22, 2008

Related U.S. Application Data

(60) Provisional application No. 60/896,139, filed on Mar. 21, 2007.

(51) Int. Cl.
*G11B 7/00* (2006.01)

(52) U.S. Cl. ............... 369/59.22; 369/47.17; 369/59.13; 369/53.12

(58) Field of Classification Search ........................ None
See application file for complete search history.

(56) References Cited

U.S. PATENT DOCUMENTS

| 6,381,082 | B1 * | 4/2002 | Voorman et al. ................. 360/25 |
| 6,426,926 | B1 * | 7/2002 | Sonu .......................... 369/47.17 |
| 6,798,832 | B1 * | 9/2004 | Nakata et al. ................. 375/233 |
| 6,928,125 | B2 * | 8/2005 | Nakano et al. ................ 375/341 |
| 7,440,379 | B2 * | 10/2008 | Minemura et al. ......... 369/59.22 |

* cited by examiner

*Primary Examiner* — Jorge L Ortiz Criado

(57) ABSTRACT

A media defect compensation system and method may decouple effects of asymmetry from baseline error compensation computations. In some embodiments, a switching mechanism passes a baseline error signal into a baseline loop when a determination is made that a baseline error signal is not affected by asymmetry, and otherwise freezes the baseline loop when asymmetry may influence baseline error calculations.

20 Claims, 6 Drawing Sheets

FIG. 5B $u_k$:       -  -  +  +  +  +  +  +  -  -  -  +  +  +  +  -  -  -  -  +  +  +  +  +  +
$b_k$:       -  -  B  +  +  +  B  -  -  -  B  +  +  B  -  -  -  -  B  +  +  +  +
$(u-b)_k$:   0  0  A  0  0  0  0  A  0  0  0  A  0  0  A  0  0  0  0  A  0  0  0  0  0
$sel_k$:     *  *  N  N  N  N  O  N  N  N  N  N  N  N  N  N  N  N  N  O  N  N  N  O  O

FIG. 5C $u_k$:     -  -  +  +  +  +  +  +  -  -  -  +  +  +  +  -  -  -  -  +  +  +  +  +  +
$sel_k$:   *  *  N  N  O  O  O  O  N  N  O  N  N  O  O  N  N  O  O  N  N  O  O  O  O
$du_k$:    *  -  -  +  +  +  +  +  +  -  -  -  +  +  +  +  -  -  -  -  +  +  +  +  +

FIG. 5D

SYSTEM AND METHOD OF DECOUPLING ASYMMETRY FROM BASELINE COMPENSATION

CROSS-REFERENCE TO RELATED APPLICATIONS

The present application claims the benefit of U.S. provisional application Ser. No. 60/896,139, filed Mar. 21, 2007, entitled "Decoupling of Asymmetry from Baseline Compensation", the disclosure of which is incorporated herein by reference in its entirety.

BACKGROUND

1. Field of the Invention

Aspects of the present invention relate generally to identifying signal loss caused by defective areas in recording media, and more particularly to a media defect compensation system and method that decouple effects of asymmetry from baseline error compensation computations.

2. Description of Related Art

Recording media (e.g., those employed in conjunction with electronic devices) typically have one or more defects. "Defects" in this context may be caused by inefficiencies or inaccuracies associated with manufacturing processes, impact damage (e.g., scratches) or surface smudges caused by mishandling, particulate contamination, and asymmetry, among other factors. Irrespective of the source, such defects tend to cause variations in signals reproduced from the recording medium; for example, defects can result in weak signals, a baseline error or shift in the reproduced signal, or a total loss of signal when a reading device tries to read data from a defective location on a recording medium. Various conventional compensation strategies attempt to eliminate the errors such defects tend to cause in reading data from various media.

In optical storage media, asymmetry is a common distortion. When asymmetry occurs, pit length on a disc becomes longer than the nominal pit length and land length becomes shorter, or vise-versa. Asymmetry can cause the readback signal to become offset; direct current (DC) errors can be greater in some places in the data stream than in others. While attempts have been made to model asymmetry, traditional baseline error compensation techniques do not take into account its effects, and so are adversely affected by asymmetry.

Therefore, it may be desirable in some instances to provide a media defect compensation system and method that decouple effects of asymmetry from baseline error compensation computations.

SUMMARY

Embodiments of the present invention overcome the above-mentioned and various other shortcomings of conventional technology, providing a media defect compensation system and method that decouple effects of asymmetry from baseline error compensation computations. In some embodiments, a switching mechanism passes a baseline error signal into a baseline loop when a determination is made that bits are not affected by asymmetry (i.e., the affect of asymmetry on a baseline error signal is negligible or otherwise below a threshold level), and otherwise freezes the baseline loop when asymmetry may influence baseline error calculations.

The foregoing and other aspects of various embodiments of the present invention will be apparent through examination of the following detailed description thereof in conjunction with the accompanying drawing figures.

BRIEF DESCRIPTION OF THE DRAWING FIGURES

FIGS. 5A-5D are simplified diagrams illustrating bit sequences associated with asymmetry analyses.

DETAILED DESCRIPTION

Introduction

Asymmetry can be modeled in a variety of ways (see, e.g., Pozidis, H., Bergmans, J. W. M., and Coene, W. M. J., "Modeling and Compensation of Asymmetry in Optical Recording", IEEE Trans. Commun., vol. 50, no. 12, December 2002). In general, for a time, k, a variable $u_k \in \{1, -1\}$ denotes the channel bits written on a recording medium, e.g., an optical disc such as a compact disc (CD) or digital versatile disc (DVD). In accordance with some techniques, a ternary sequence, $b_k$, is used to model the asymmetry. The values for bits in the ternary sequence may be computed as follows:

$$b_k = u_k - 0.25(|A| + Au_k)(2u_k - u_{k-1} - u_{k+1}) \qquad \text{(Eq. 1)}$$

When positive asymmetry is present, A>0; an example of the sequences is illustrated in FIG. 5A, where the "+" symbol represents a +1 value for $u_k$, the "−" symbol represents a −1 value for $u_k$, and "B" (a representation of the amount or magnitude of positive asymmetry present) is equal to 1−A. Conversely, when negative asymmetry is present, A<0; an example of the sequences is illustrated in FIG. 5B, where "B" (a representation of the amount of negative asymmetry present) is equal to −1−A.

In traditional implementations, the readback samples are typically modeled as $b_k * g_k$, where $g_k$ denotes a specific target signal in a Partial Response Maximum Likelihood (PRML) channel, and the operator * denotes a convolution.

In addition to asymmetry, the readback samples are usually distorted by slow-changing, low frequency direct current (DC) distortions known as baseline error, or baseline shift. Where $r_k$ denotes the baseline error, the readback samples, $s_k$, may be expressed as indicated in Equation 2:

$$s_k = (b*g)_k + r_k \qquad \text{(Eq. 2)}$$

In read channel processing, a baseline loop may be employed to compensate for baseline errors. In that regard, FIG. 1 is a simplified diagram illustrating a conventional circuit including a baseline loop to compensate for baseline errors in a read channel.

Figure 1:
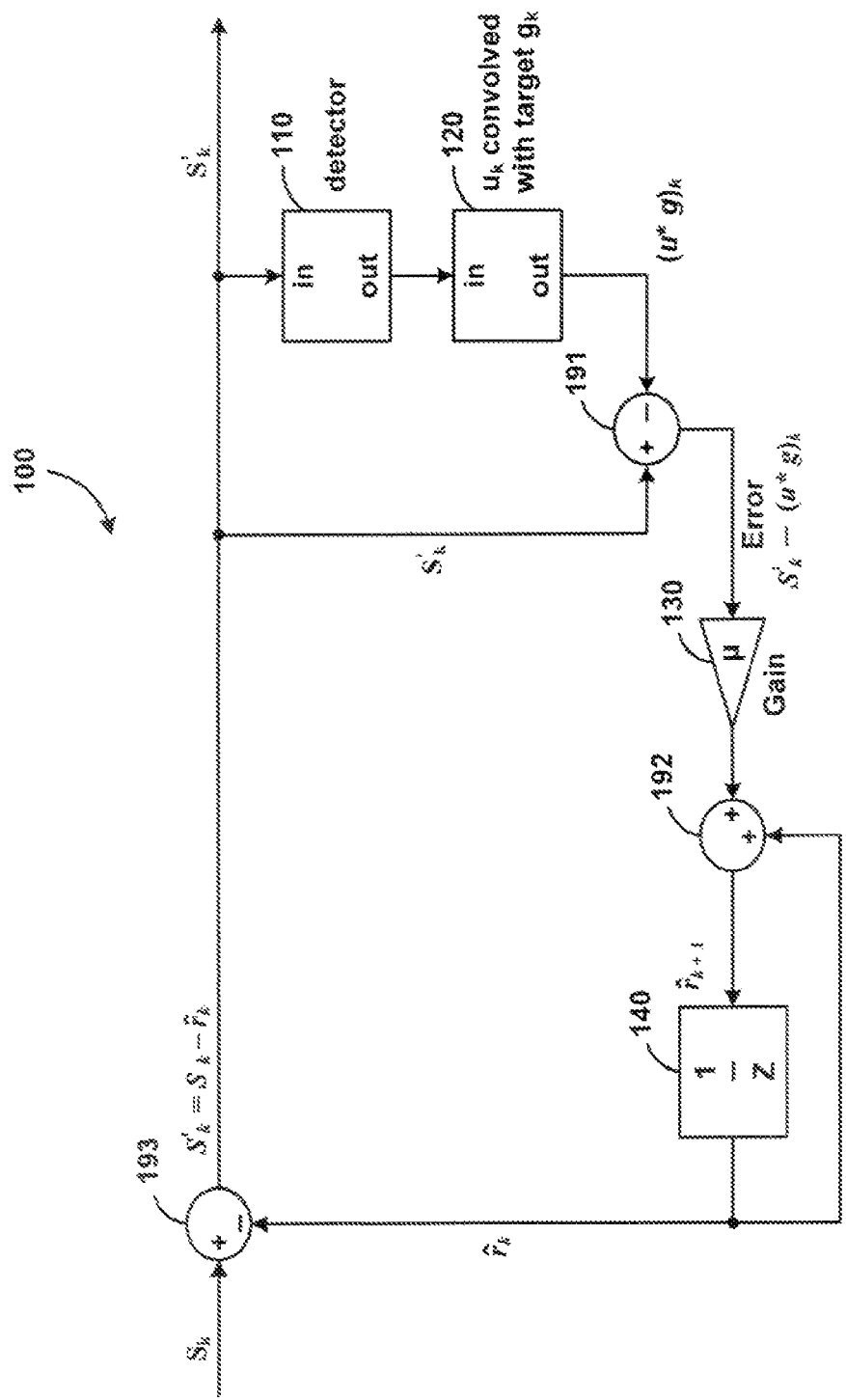
FIG. 1 is a simplified diagram illustrating a conventional circuit including a baseline loop to compensate for baseline errors in a read channel.

As indicated in FIG. 1, a traditional baseline error compensation circuit 100 generally includes a data detector 110, a convolution block 120 (for convolving $u_k$ and $g_k$), an amplifier 130 (for multiplying an error signal by a factor, $\mu$), and a delay element 140. Adders 191, 192, and 193 operate substantially as depicted in FIG. 1.

The following relationships are established by the architecture of the system illustrated in FIG. 1.

$$s'_k = s_k - \hat{r}_k \quad \text{(Eq. 3)}$$

$$\hat{r}_{k+1} = \hat{r} + \mu(s'_k - (\hat{u}*g)_k) \quad \text{(Eq. 4)}$$

In Equations 3 and 4, $\hat{r}_k$ is an estimated baseline error at time k. In typical calculations, it is assumed that data detector 110 makes no decision errors, so it is assumed that $\hat{u}_k = u_k$ in Equation 4; the following description assumes $\hat{u}_k = u_k$ for all purposes. If the medium being read contains no asymmetry, then $b_k = u_k$, and the baseline compensation strategy employed by the circuit of FIG. 1 works properly. However, when the medium contains asymmetry, operation of the baseline loop of FIG. 1 will be disturbed.

As an example, consider the case where $r_k = 0$. Ideally, the baseline loop should estimate $\hat{r}_k = r_k = 0$, and therefore $s'_k = s_k$ for all k, but this ideal situation will generally not be achieved due to asymmetry in the medium being read. Where asymmetry is introduced, $b_k$ at the next transition (i.e., where the value of $u_k$ transitions from +1 to −1 or vice-versa) may contain a second term other than $u_k$ (i.e., $b_k \neq u_k$) so the error signal $s'_1 - (u*g)_k$ will not be zero. The non-zero error drives $\hat{r}_k$ to a non-zero value (see Equation 4). In turn (see Equation 3), the non-zero $\hat{r}_k$ renders $s'_k = s_k$ not true. In the foregoing manner, the ideal baseline error compensation loop is disturbed by asymmetry, and the circuit of FIG. 1 provides inaccurate results.

As set forth below, a media defect compensation system and method may reduce or eliminate baseline loop inaccuracies by selectively decoupling asymmetry effects from baseline error computations.

Implementation

Figure 2:
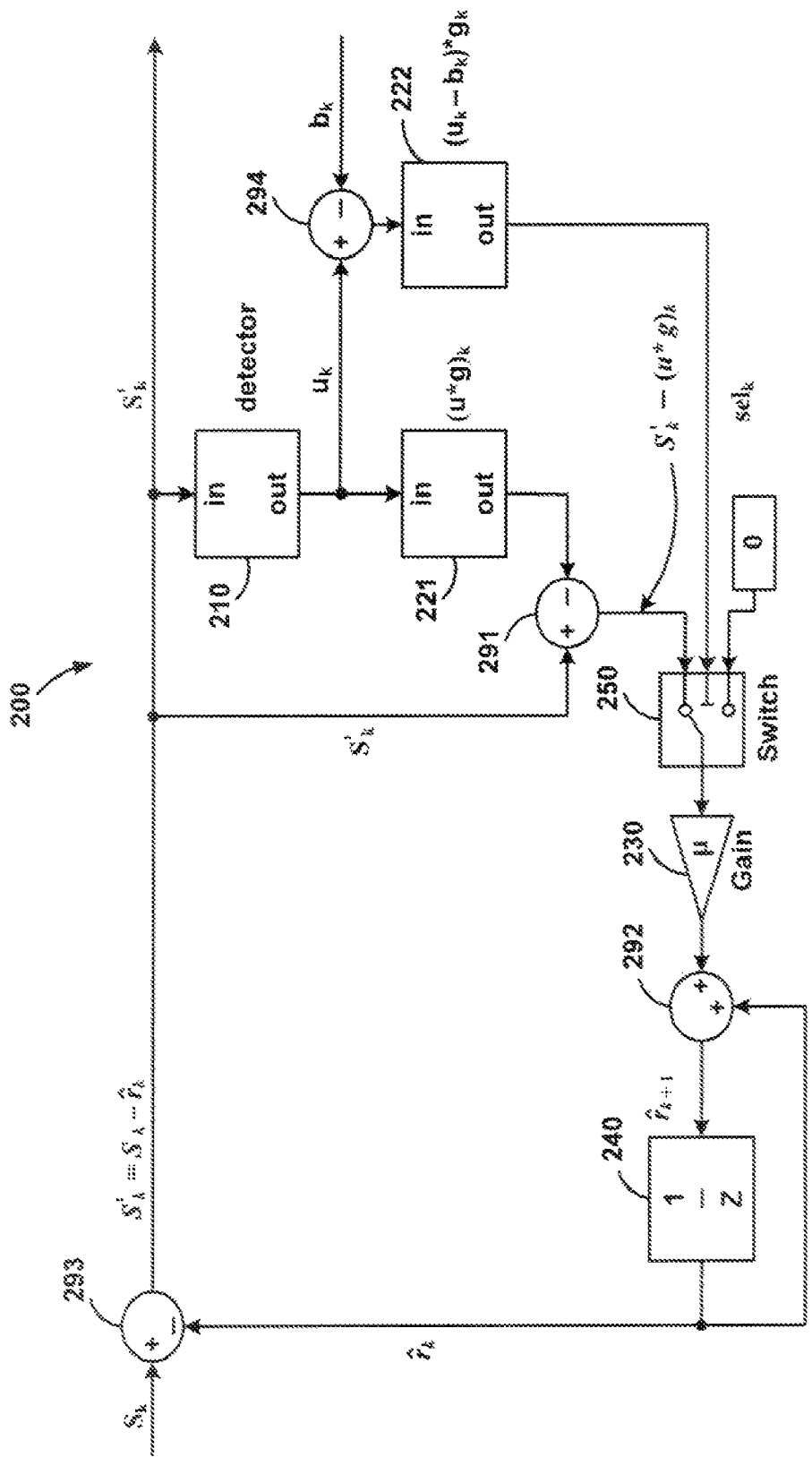
FIG. 2 is a simplified diagram illustrating components of one embodiment of a circuit to decouple effects of asymmetry from baseline error compensation computations.

FIG. 2 is a simplified diagram illustrating components of one embodiment of a circuit to decouple effects of asymmetry from baseline error compensation computations. It will be appreciated that the architecture illustrated in FIG. 2 may be implemented in a single, monolithic integrated circuit (IC) or an application specific IC (ASIC), for instance. Alternatively, the various components illustrated in FIG. 2 need not be integrated into a single chip, IC, or hardware device.

As indicated in FIG. 2, a baseline error compensation circuit 200 may generally include a data detector 210, two convolution blocks 221 and 222 (for respectively convolving $u_k$ and $g_k$ and the difference $u_k - b_k$ and $g_k$), an amplifier 230 (for multiplying an error signal by a factor, $\mu$), and a delay element 240. In addition, circuit 200 includes a switching mechanism 250 for decoupling asymmetry influences from baseline error calculations as set forth below. Adders 291, 292, 293, and 294 operate substantially as depicted in FIG. 2 (i.e., an "adder" in this context may also perform subtraction operations).

As illustrated in FIG. 2, delay element 240 may be employed as an accumulator with respect to an error signal and a previously computed baseline error estimation, $\hat{r}_k$, facilitated by adder 292 as indicated. In that regard, a delay (e.g., 1/Z) for delay element 240 may be selected in accordance with signal processing capabilities and computational or other operations conducted at other components of circuit 200.

Detector 210 may be employed to identify a bit stream that is predicted to be an accurate representation of the data, i.e., the specific sequence of binary numbers that represent actual data (i.e., $u_k$) read from the recording medium, as opposed to noise, intersymbol interference, distortion, or other anomalies in the signal caused, for example, by modulation, compression, or other factors. Several types of data detectors are generally known in the art as having utility in digital signal processing; these may be implemented in accordance with the particular modulation scheme employed for the signal, for example, or as a function of numerous other factors such as compression algorithms, data throughput rates, convolutional codes, and the like.

Though its implementation and general operation may depend upon the media reader with which it is to be used, detector 210 may be embodied in or comprise a so-called trellis detector, for example, or other type of detector capable of decoding a bit stream encoded with a convolutional code. In some implementations, detector 210 comprises a Viterbi detector capable of performing a maximum likelihood estimation regarding the probable location of symbols in the data stream. As noted above, suitable embodiments of detector 210 are generally known in the art; the present disclosure is not intended to be limited to any particular data detection technology, coding strategy, or algorithm.

Convolution blocks 221 and 222 may be implemented in hardware, for example, and generally include respective convolution engines to convolve bit streams with a target, $g_k$. In some implementations, convolution blocks 221 and 222 may be replaced with a single, suitably programmable microprocessor or other hardware element that executes convolution operations under software control; various hardware- and software-based convolution strategies may be suitable depending, for example, upon desired performance characteristics of circuit 200, cost considerations, and other factors. Similarly, switching mechanism 250 may be implemented in accordance with software instruction sets, though it may be desirable in many applications to implement switching mechanism 250 in hardware.

In operation of the circuit in FIG. 2, an ideal case may be assumed in which an asymmetry model is accurate, and therefore ternary bits, $b_k$, are known. Where $b_k$ and $u_k$ are known, a determination may be made regarding which bits are affected by asymmetry. In that regard, the length of the target $g_k$ may be denoted as a numeral, N; from Equation 3, it can be seen that if no bit is affected by asymmetry in N consecutive bits, $u_{k-N+1} \sim u_k$, then $s_k$ is not affected by asymmetry either. Using this $s_k$ to generate the error signal for the baseline loop then prevents the baseline loop from being affected by asymmetry. In light of the foregoing, a selector signal, $sel_k$, may be derived (e.g., at convolution block 222) as follows:

$$sel_k = (u_k - b_k) * g_k \quad \text{(Eq. 5)}$$

If none of the consecutive bits $u_{k-N+1} \sim u_k$ is affected by asymmetry, then it will be true that $(u_{k-N+1} - b_{k-N+1}) \sim (u_k - b_k)$ are all zeros, as well; therefore $sel_k$ will be zero. However, if some bits in the sequence $u_{k-N+1} \sim u_k$ are affected by asymmetry, then consequently at least some of $(u_{k-N+1} - b_{k-N+1}) \sim (u_k - b_k)$ will be non-zero; therefore $sel_k$ will also be non-zero.

Since $sel_k = 0$ provides an indication that $u_{k-N+1} \sim u_k$ is not affected by asymmetry, this condition also indicates that any baseline error that exists at time k is not affected by asymmetry. Therefore, switching mechanism 250 may be employed to pass the baseline error $(s'_k - (u*g)_k)$ whenever $sel_k$ equals 0, and alternatively to freeze the baseline loop by passing 0 whenever $sel_k$ is non-zero. An example of the sequences is illustrated in FIG. 5C, where "N" represents a non-zero value for $sel_k$. The baseline loop of FIG. 2 updates whenever $sel_k = 0$.

In the foregoing manner, asymmetry effects on baseline loop computations may be reduced or eliminated (since the baseline loop is frozen when asymmetry may adversely affect calculations) by passing the baseline error signal only when the effect of asymmetry on that baseline error signal is minimal (e.g., below a threshold), negligible, or may otherwise be ignored, assuming that the asymmetry model is accurate. However, due to equalization errors or other factors, this assumption may not be true under all circumstances; accordingly, the FIG. 2 embodiment may not completely remove all influences on the baseline loop due to asymmetry. As set forth below, an alternative decoupling method may be less complicated or less expensive to implement.

Figure 3:
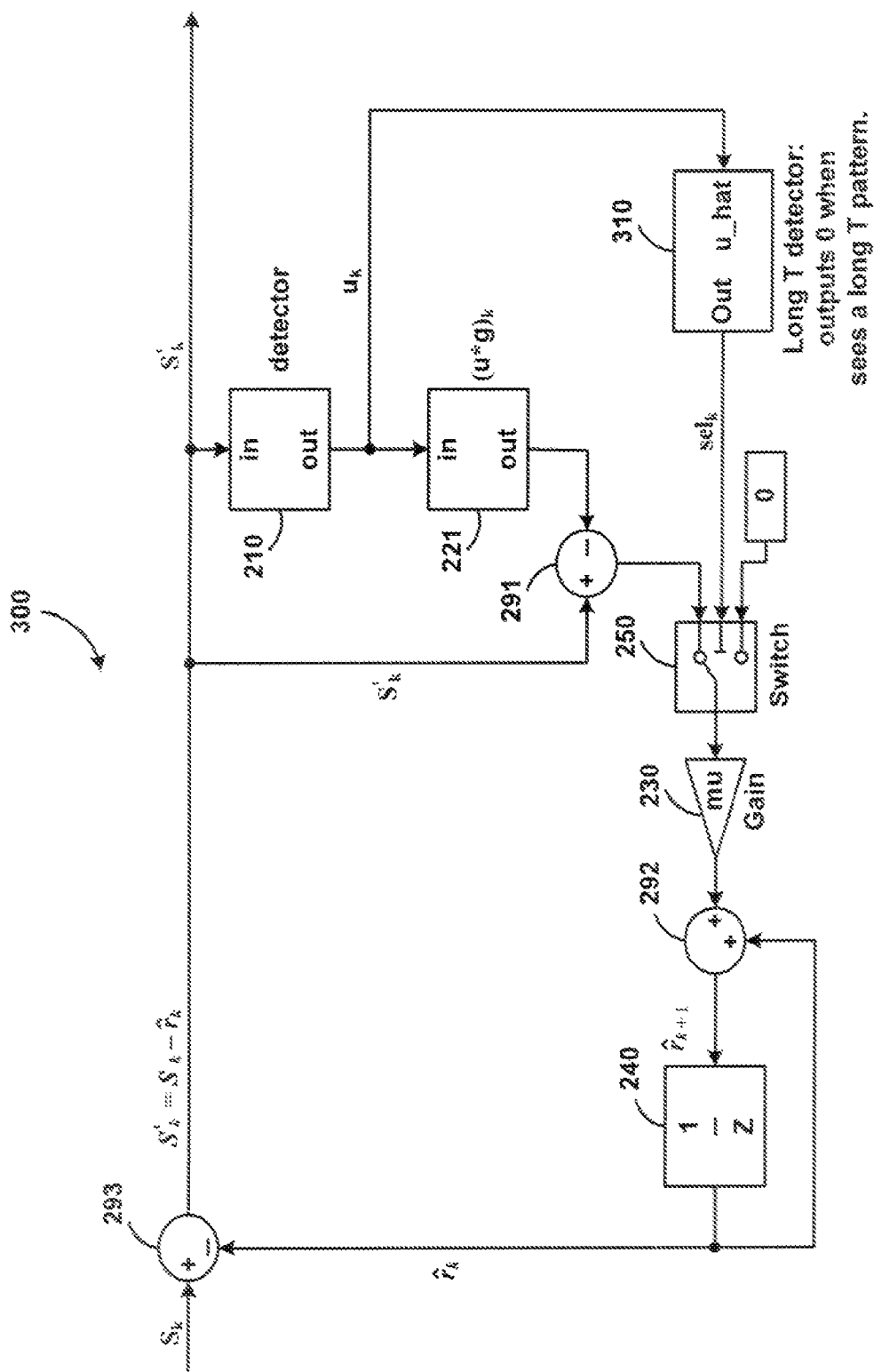
FIG. 3 is a simplified diagram illustrating components of another embodiment of a circuit to decouple effects of asymmetry from baseline error compensation computations.
Figure 4:
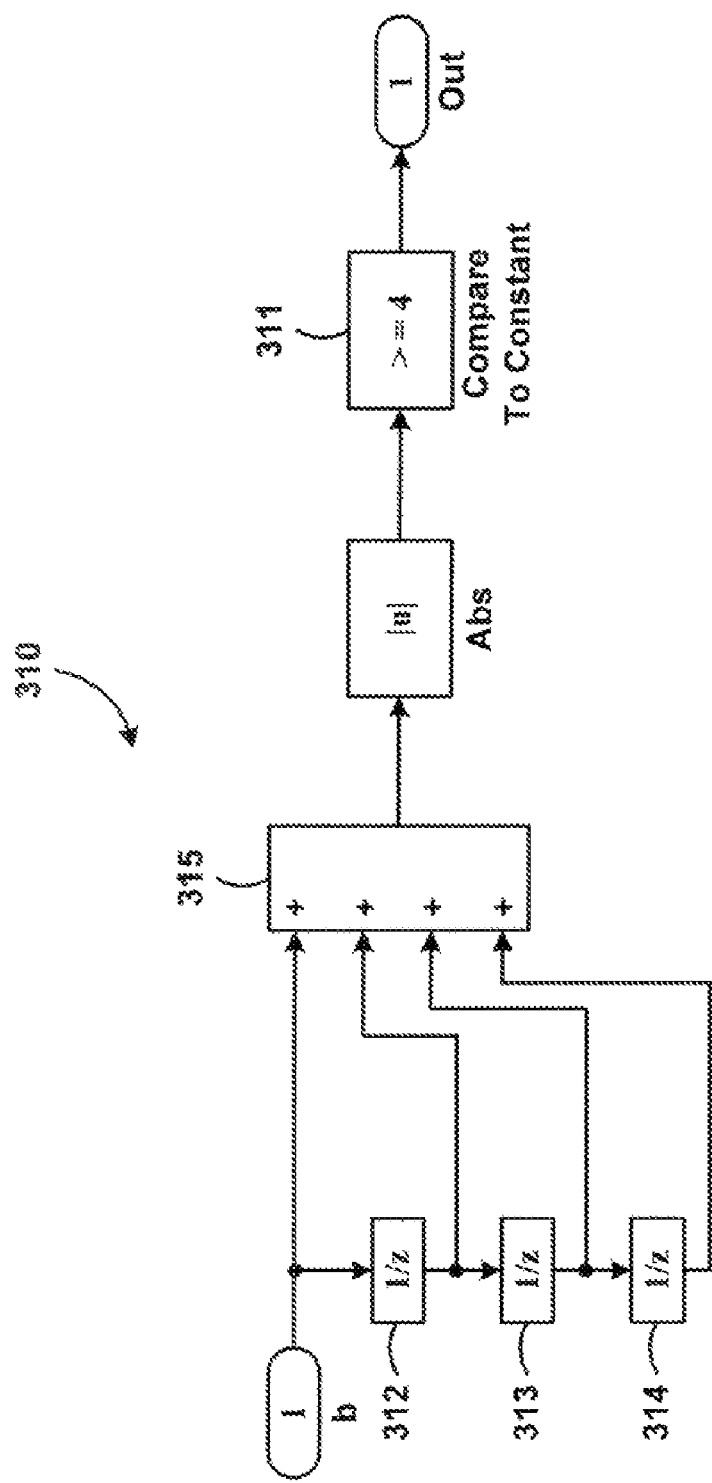
FIG. 4 is a simplified diagram illustrating elements of one embodiment of a long T detector having utility in the circuit of FIG. 3.

In particular, FIG. 3 is a simplified diagram illustrating components of another embodiment of a circuit to decouple effects of asymmetry from baseline error compensation computations, and FIG. 4 is a simplified diagram illustrating elements of one embodiment of a long T detector having utility in the circuit of FIG. 3. The hardware components of FIGS. 3 and 4 may be integrated into a single IC or ASIC in some embodiments.

As in the FIG. 2 embodiment, the baseline error compensation circuit 300 illustrated in FIG. 3 may generally include a data detector 210, an amplifier 230 (for multiplying an error signal by a factor, μ), a delay element 240, and a switching mechanism 250 for decoupling asymmetry influences from baseline error calculations as set forth below. Adders 291, 292, and 293 operate substantially as depicted in FIG. 3 (i.e., an "adder" in this context may also perform subtraction operations). Circuit 300 may also include a convolution block 221 embodied in or comprising a hardware or software convolution engine for convolving $u_k$ and $g_k$, while convolution block 222 in the FIG. 2 embodiment may be omitted. Circuit 300 may also employ a long T detector 310 to generate a selector signal, $sel_k$.

It will be appreciated that asymmetry is caused by transitions between lands and pits (i.e., bits having values of +1 and bits having values of −1) on the recording medium. Therefore, the effect of asymmetry is generally lower in locations that are relatively distant from transitions, as opposed to locations that are relatively close to such transitions. At every time, k, it is possible to detect the nearest transition by monitoring bit intervals. If the distance or interval between transitions is greater than a particular threshold, the baseline loop may be updated to compute baseline error free of asymmetry effects; otherwise, the baseline loop may be frozen by switching mechanism 250.

In operation of circuit 300, long T detector 310 receives $u_k$ as input and provides $sel_k$ as output; the value of $sel_k$ may depend upon the number of consecutive values for $u_k$ that occur without transition. When a predetermined number of consecutive +1 or −1 values for $u_k$ exceeds a threshold, $sel_k$ may be set to zero, causing switching mechanism 250 to pass baseline error $(s'_1-(u*g)_k)$ into the baseline loop. Otherwise, switching mechanism 250 may pass zero to freeze the baseline loop. In accordance with the embodiment illustrated in FIG. 3, it may not be necessary to compute $b_k$ (Equation 1) or $sel_k$ (as defined by Equation 5) in order to decouple asymmetry effects from baseline error computations. In the foregoing manner, it may be established that asymmetry does not affect the data after a predetermined interval between the transitions; accordingly, the baseline error signal may be passed when the effect of asymmetry on the baseline error signal is determined to be below a threshold or is otherwise negligible.

An example of the sequences is illustrated in FIG. 5D. As noted above, output ($sel_k$) of long T detector 310 may be set to zero when a predetermined pattern of bit values for $u_k$ is identified; in some embodiments, this pattern is 4T. When the threshold for consecutive values of $u_k$ has not been reached, $sel_k$ is non-zero (represented by N in FIG. 5D), indicating that a transition is near enough that asymmetry effects may adversely influence baseline error calculations. The sequence $du_k$ denotes $u_k$ delayed by one tap; as indicated in FIG. 5D, when ($sel_k$) is zero, $du_k$ is two bit intervals away from any transitions.

FIG. 4 illustrates certain components of one embodiment of long T detector 310. Input may be provided to a multiplexer 315 through delay elements 312-314. In certain implementations, long T detector 310 outputs a logic "zero" whenever a 4T or longer (labeled ">=4") interval with no transition is detected at comparator 311, and outputs a logic "one" whenever a 3T or shorter (i.e., <4) bit interval is detected. Those of skill in the art will appreciate that long T detector 310 may be configured or programmed to output a logic "zero" whenever an interval ">=NT" is detected and a logic "one" whenever an interval "<NT" is detected. In this case, long T detector may be implemented with an arbitrary or desired number, N, of delay elements, and the threshold of comparator 311 may be set to NT. In some embodiments, the value of N may be set to an integer within a range between 0 and 11, though higher integer values of N may have utility in some applications.

Figure 6:
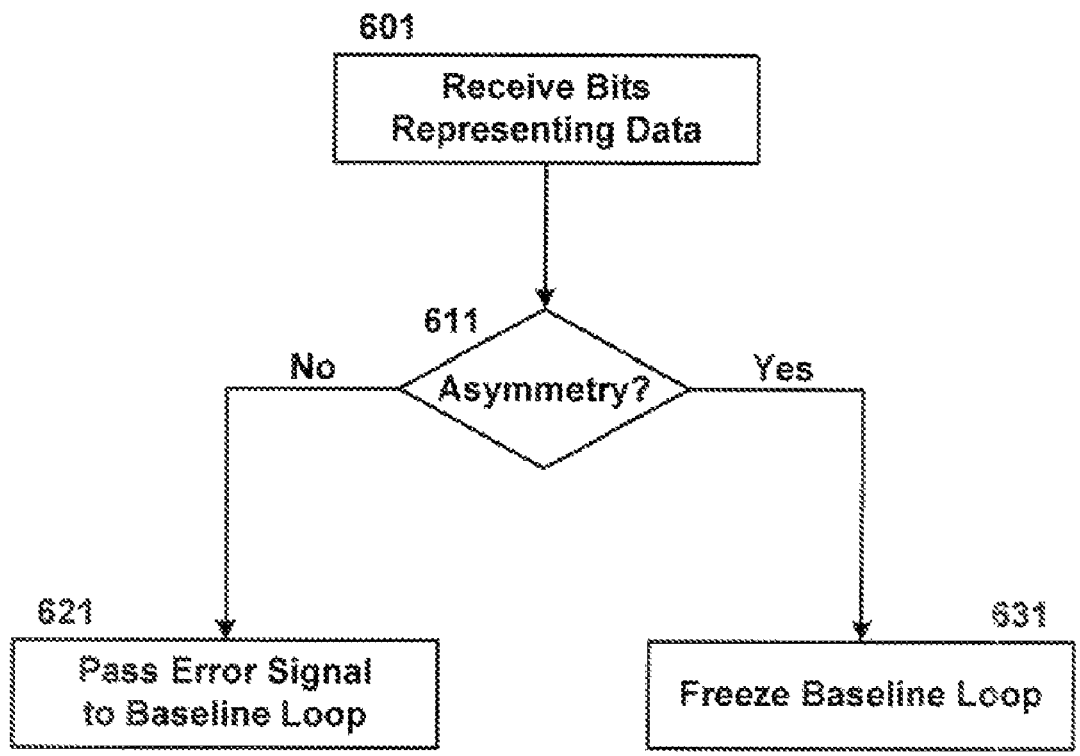
FIG. 6 is a simplified flow diagram illustrating operation of one embodiment of a method of decoupling effects of asymmetry from baseline error compensation computations.

FIG. 6 is a simplified flow diagram illustrating operation of one embodiment of a method of decoupling effects of asymmetry from baseline error compensation computations.

A signal representing data read from a recording medium may be received as indicated at block 601. A readback signal may be read by a data detector (such as detector 210 in FIGS. 2 and 3) such that data bits (e.g., represented by values of $u_k$) may be identified. A determination may be made (e.g., at decision block 611) whether asymmetry may potentially affect subsequent baseline error computations. As set forth above with reference to FIGS. 2 and 3, this determination may be made for a given bit sequence, for example, by convolving a segment of the bit sequence with a particular target, or by monitoring a bit sequence for transitions over time.

Where asymmetry is not a factor (i.e., where its effect on a baseline error signal is below a predetermined threshold or otherwise negligible), an error signal may be passed to a baseline loop as indicated at block 621; alternatively, the baseline loop may be frozen (block 631) where asymmetry may influence baseline error computations. In that regard, a switching mechanism (such as indicated by reference numeral 250 in FIGS. 2 and 3) may be employed to pass either an error signal (such as $s'_k-(u*g)_k$) or a logic zero to the baseline loop as a function of an input (such as $sel_k$) to a switch. It will be appreciated that the error signal may be a function of various factors and may depend upon, for instance, the manner in which asymmetry is modeled. Similarly, input to the switching mechanism may vary as a function of bit intervals between transitions, for example, as described above with reference to FIGS. 3 and 4; as an alternative, this input may be derived as a function of a convolution operation as set forth above with reference to FIG. 2.

In accordance with the foregoing method, a baseline error signal may be passed to the baseline loop only when asymmetry is determined not to affect the baseline error signal such that baseline error computations may be compromised or otherwise rendered inaccurate. Conversely, where asymmetry may influence subsequent baseline error calculations, the baseline loop may be frozen such that variable values in their current state are employed until the baseline loop is reset. In that regard, the baseline loop may be reset when asymmetry is once again determined not to influence subsequent baseline error computations.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A media defect compensation circuit comprising:
   a data detector to detect data reproduced from a recording medium;
   a baseline loop to employ output from said data detector to compensate for baseline errors in the data; and
   a switching mechanism to pass a baseline error signal to said baseline loop when $$sel_k = (u_k - b_k) * g_k$$

equals 0, where
   $sel_k$ is a selector signal provided to said switching mechanism;
   $u_k$ is a variable, where $u_k \in \{1, -1\}$ denotes channel bits written on the recording medium;
   $b_k$ is a ternary sequence used to model asymmetry; and
   $g_k$ denotes a specific target signal in a partial Response Maximum Likelihood (PRML) channel, and * denotes a convolution.

2. The circuit of claim 1 further comprising a convolution engine to convolve an output of said data detector with a target signal to generate the baseline error signal.

3. The circuit of claim 1 further comprising an adder to subtract data bits representing an asymmetry model from an output of said data detector to generate an input to said switching mechanism.

4. The circuit of claim 3 further comprising a convolution engine to produce the input to said switching mechanism as a function of a convolution of a target signal and output of said adder.

5. The circuit of claim 1 further comprising a transition detector to identify transitions in an output of said data detector.

6. The circuit of claim 5 wherein said transition detector generates an input to said switching mechanism as a function of a predetermined interval between the transitions.

7. The circuit of claim 1 wherein said data detector is a trellis detector.

8. The circuit of claim 1 wherein an output of said data detector is convolved with a target signal to generate the baseline error signal.

9. The circuit of claim 1 wherein data bits representing an asymmetry model are subtracted from an output of said data detector to generate an input to said switching mechanism.

10. The circuit of claim 9 wherein the input to said switching mechanism is a function of a convolution of a target signal and the difference between the data bits representing the asymmetry model and the output of said data detector.

11. A baseline error computation method comprising:
    generating a baseline error signal from a signal representing data reproduced from a recording medium;
    determining whether the baseline error signal is affected by asymmetry in the recording medium; and
    responsive to said determining, passing the baseline error signal to a baseline loop when
    $sel_k = (u_k - b_k) * g_k$ equals 0, where $sel_k$ is a selector signal;
    $u_k$ is a variable, where $u_k \in \{1, -1\}$ denotes channel bits written on the recording medium;
    $b_k$ is a ternary sequence used to model asymmetry; and
    $g_k$ denotes a specific target signal in a partial Response Maximum Likelihood (PRML) channel, and * denotes a convolution.

12. The method of claim 11 wherein said generating comprises convolving the data with a target signal.

13. The method of claim 12 wherein said generating further comprises subtracting a result of said convolving from a signal representing a difference between the data and an estimated baseline error.

14. The method of claim 11 wherein said determining comprises utilizing an asymmetry model.

15. The method of claim 14 wherein said determining further comprises subtracting data bits representing the asymmetry model from the data.

16. The method of claim 15 wherein said determining further comprises convolving a target signal with a result of said subtracting.

17. The method of claim 11 wherein said determining comprises identifying transitions in values of the bits in the data.

18. The method of claim 17 wherein said determining further comprises determining that asymmetry does not affect the baseline error signal after a predetermined interval between the transitions.

19. The method of claim 11 further comprising utilizing a data detector to receive the signal representing data reproduced from a recording medium.

20. The method of claim 19 wherein the data detector is a trellis detector.

* * * * *